United States Patent [19]  
Chatelin et al.

[11] 4,427,103  
[45] Jan. 24, 1984

[54] DIAPHRAGM CLUTCH MECHANISM, PARTICULARLY FOR A MOTOR VEHICLE

[75] Inventors: Jean-Pierre Chatelin, Taverny; André Caray, Paris, both of France

[73] Assignee: Valeo, Paris, France

[21] Appl. No.: 227,693

[22] Filed: Jan. 23, 1981

[30] Foreign Application Priority Data

Jan. 25, 1980 [FR] France ............................. 80 01599

[51] Int. Cl.³ .............................................. F16D 13/71
[52] U.S. Cl. .................................................. 192/89 B
[58] Field of Search ........................... 192/70.27, 89 B

[56] References Cited

U.S. PATENT DOCUMENTS 4,039,059 8/1977 de Gennes .................... 192/89 B
4,069,905 1/1978 de Gennes .................. 192/89 B X

FOREIGN PATENT DOCUMENTS 2205456 8/1973 Fed. Rep. of Germany .
1417880 10/1965 France .
2282572 3/1976 France .
2385942 10/1978 France .

Primary Examiner—Allan D. Herrmann  
Attorney, Agent, or Firm—Charles E. Brown

[57] ABSTRACT

A clutch mechanism is concerned in which the retaining lugs (28) which link to the cover (10) the retaining ring (26) which ensures that the diaphragm (11) is secured to the cover (10) have come in one piece with this retaining ring (26).

According to the invention, each retaining lug (28) of the retaining ring (26) is fixed on the cover (10) between, for example, one or two transverse shoulders (36) which said retaining lug possesses for this purpose on a first side of the cover (10) and an end (34) which is folded back to bear against the cover (10) on the other side of the latter.

Application, in particular, to diaphragm clutch mechanisms for motor vehicles.

8 Claims, 15 Drawing Figures

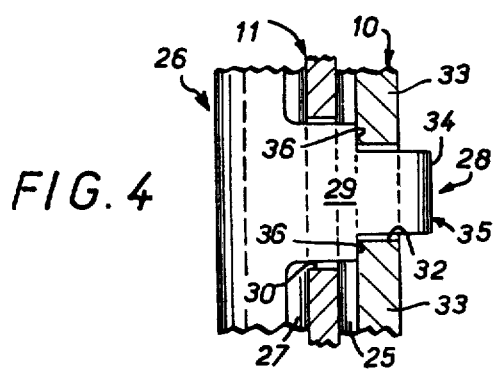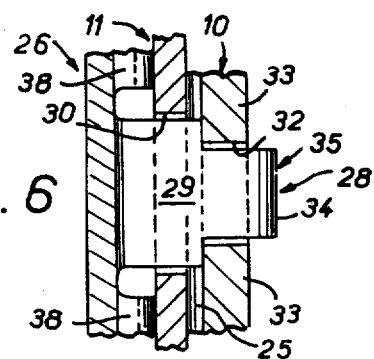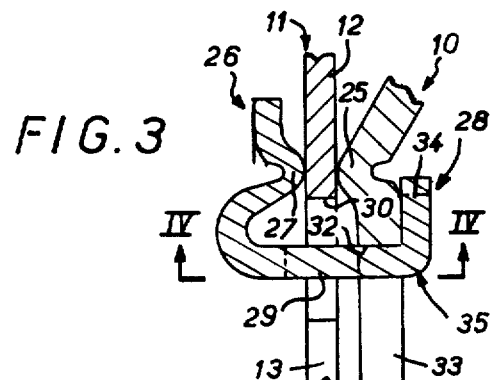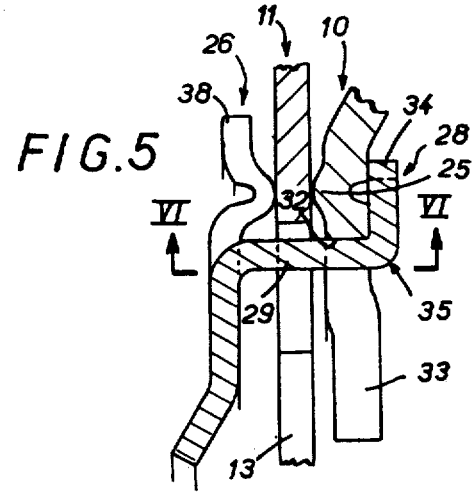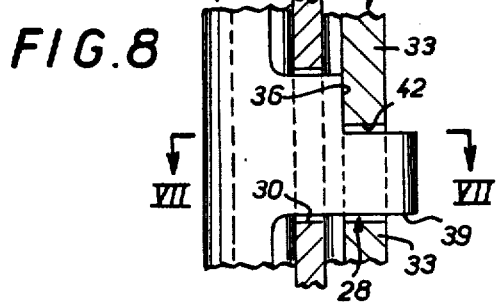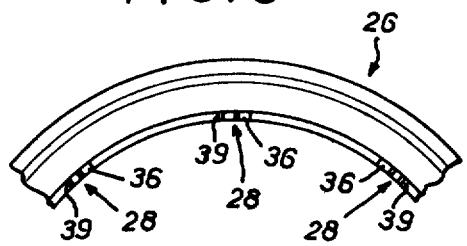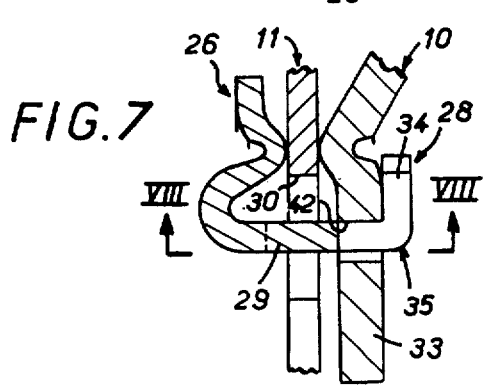

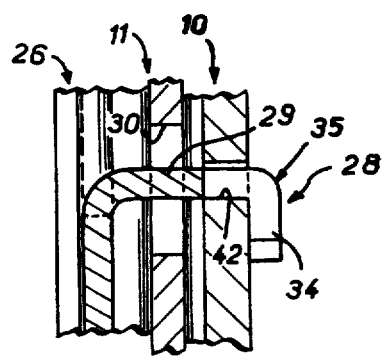
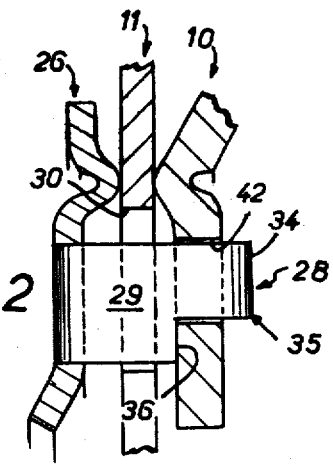
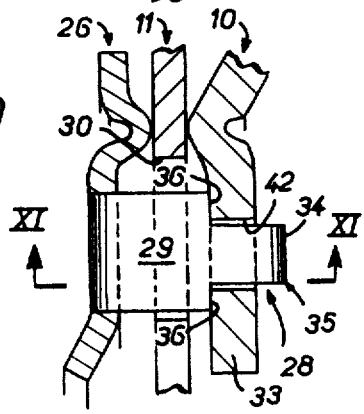
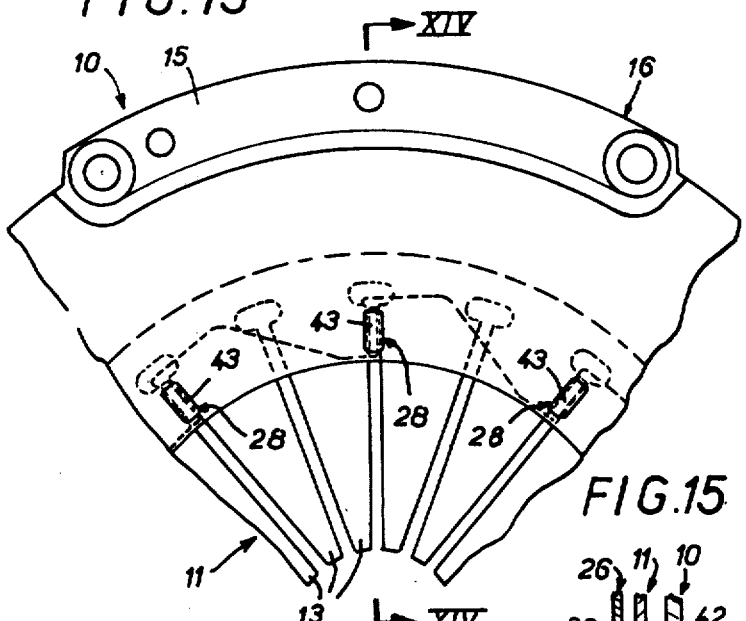
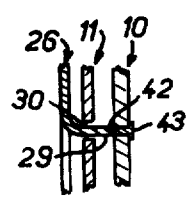
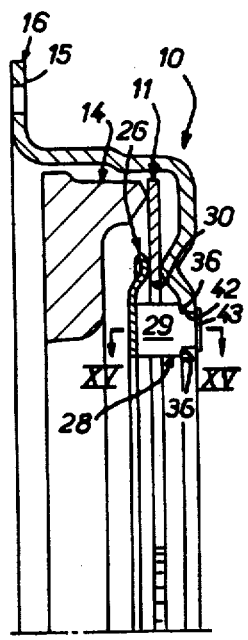

DIAPHRAGM CLUTCH MECHANISM, PARTICULARLY FOR A MOTOR VEHICLE

The present invention relates, in general terms, to diaphragm clutch mechanisms, particularly for a motor vehicle, of the type comprising a first substantially annular piece, called a cover, a second substantially annular piece, called a diaphragm, which has a peripheral part constituting a cup spring and a central part which is divided into radial fingers and to which the cover offers circularly a first support, referred to here for convenience as a primary support, either directly or indirectly via a ring, means of assembly which secure said diaphragm in a pivoting manner to said cover by offering circularly to said diaphragm a second support, referred to here for convenience as a secondary support, and a third annular piece, called a pressure plate, which rotates integrally with the cover, while being movable axially in relation to the latter, and on which the diaphragm bears by its peripheral part constituting a cup spring.

By its cover, such a clutch mechanism is adapted to be attached to a plate, called a reaction plate or flywheel, which is integral with a first shaft, generally a drive shaft, there being inserted between this reaction plate and the pressure plate a friction disc which rotates integrally with a second shaft, generally a driven shaft, whilst arranged around the latter is a piece, called a clutch bearing, which is capable of acting on the radial fingers of the diaphragm, in order to disengage the clutch thus formed, which is normally engaged, the pressure plate normally clamping the friction disc against the reaction plate under the stress of the peripheral part, constituting a cup spring, of the diaphragm.

The present invention is aimed, more particularly, at those of such clutch mechanisms in which the means of assembly which secure the diaphragm in a pivoting manner to the cover comprise a fourth annular piece, called a retaining ring, which, on the one hand, offers circularly to the diaphragm its secondary support, on the side of said diaphragm lying opposite the cover, either directly or indirectly via a ring, and which, on the other hand, is provided, as a single unit, with flat, thin retaining lugs by means of which it is linked to the cover and which pass through the diaphragm via an axial part, most often by way of apertures which are made in said diaphragm in the vicinity of the root of its radial fingers.

Such a clutch mechanism is described, in particular, in French Pat. No. 1,319,636.

In this French patent, the retaining lugs of the retaining ring each define simply, on the far side of the cover relative to the diaphragm, a wedging elbow to effect an axial support, in one direction, on said cover.

The result is that the retaining ring is not actually carried by the cover, but simply bears axially, in a single direction, on said cover.

Although such an arrangement has given and can continue to give satisfaction, it has the following disadvantages.

First of all, if, during operation, any one of the primary and secondary supports of the diaphragm is subjected to any wear whatever, there inevitably results for the retaining ring a capability of play, in respect of the cover, which generates noise and is liable to accentuate further the wear which brought it about.

Moreover, and for the same reasons as above, it is virtually impossible systematically to provide, without risk of noise and of wear, a play between the primary and secondary supports of the diaphragm, whilst, on the contrary, such a play can be sought systematically for the disengaged position of the whole assembly.

It has already been proposed, it is true, particularly in U.S. Pat. No. 2,211,192, to secure the retaining ring to the cover in a fixed manner.

However, in this U.S. Patent this securing is effected by welding the retaining lugs of the retaining ring to a cylindrical collar which the cover possesses axially, for this purpose, on its inner periphery.

Apart from the fact that such a construction is relatively expensive to put into effect because of the welding which has to be done, it leads to a considerable axial bulk, both because of the need to provide a cylindrical collar on the inner periphery of the cover and because of the relatively large radius of curvature which the transverse wall of the cover must possess to enable it to be connected to said cylindrical collar.

The object of the present invention is, in general terms, an arrangement which enables these disadvantages to be avoided and which also has other advantages.

More precisely, it relates to a diaphragm clutch mechanism, particularly for a motor vehicle, of the type comprising a first substantially annular piece, called a cover, a second substantially annular piece, called a diaphragm, which has a peripheral part constituting a cup spring and a central part which is divided into radial fingers and to which the cover offers circularly a first support, called a primary support, means of assembly which secure in a pivoting manner said diaphragm to said cover, and a third annular piece, called a pressure plate, which rotates integrally with the cover, while being movable axially in relation to said cover, and on which the diaphragm bears by its peripheral part constituting a cup spring, said means of assembly comprising a fourth annular piece, called a retaining ring, which, on the one hand, offers circularly a second support to the diaphragm, called a secondary support, on the far side of the diaphragm relative to the cover, and which, on the other hand, is provided, as a single unit, with retaining lugs by means of which it is linked to the cover and which pass through the diaphragm via an axial part, this diaphragm clutch mechanism being characterised in that each retaining lug of the retaining ring bears on the cover both axially in a first direction and axially in the opposite direction, so that it is fixed on said cover.

As is known, a piece is fixed on another piece when it is coupled to the latter by simple mechanical engagement, without it being necessary, for example, to effect any welding whatever between said pieces.

According to a first embodiment of the invention, in which, in a known way, the retaining lugs of the retaining ring each define, on the far side of the cover relative to the diaphragm, a wedging elbow to provide an axial support, in one direction, on said cover, said retaining lugs of the retaining ring each having, on the near side of the cover relative to the diaphragm, to fix them to the latter, a transverse shoulder which enables them to bear axially on said cover in the direction opposite to the preceding direction.

Alternatively, according to a second embodiment of the invention, the retaining lugs of the retaining ring each have, to fix them on the cover, on the one hand, on the near side of the cover relative to the diaphragm, a transverse shoulder to enable them to bear axially, in one direction, on said cover, and, on the other hand, on the far side of said transverse shoulder, a prolongation of smaller cross-section which passes through the cover and which, on the far side of said cover relative to the diaphragm, is caulked at least locally to enable it to bear axially on the cover in the direction opposite to the preceding direction.

At all events, the retaining ring is advantageously carried by the cover, so that no noise is normally to be feared in the case of wear of any one of the primary and secondary supports of the diaphragm.

Moreover, it is possible, advantageously, with the arrangement according to the invention, to ensure either that no play ever appears between the primary and secondary supports of the diaphragm or, on the contrary, that such a play appears systematically at every disengagement.

Furthermore, the advantageous result of the fixing of the retaining ring to the cover is that the whole assembly, particularly the inner periphery of the cover which is affected by this fixing, is made considerably more rigid.

Finally, the transverse shoulder or shoulders which each retaining lug of the retaining ring possesses according to the invention facilitate the calibrating which is to be carried out, when the whole assembly is put together, upon completion of the axial stacking of the various annular pieces in question and of the bending or caulking of the ends of the retaining lugs of the retaining ring, in order to obtain the desired clamping or the desired play between the primary and secondary supports of the diaphragm; in fact, for such a calibration, this transverse shoulder or these transverse shoulders provide a precise counter-support for each retaining lug of the retaining ring.

The characteristic features and advantages of the invention will emerge, moreover, from the following description, by way of example, with reference to the attached diagrammatic drawings in which.

Figure 1:
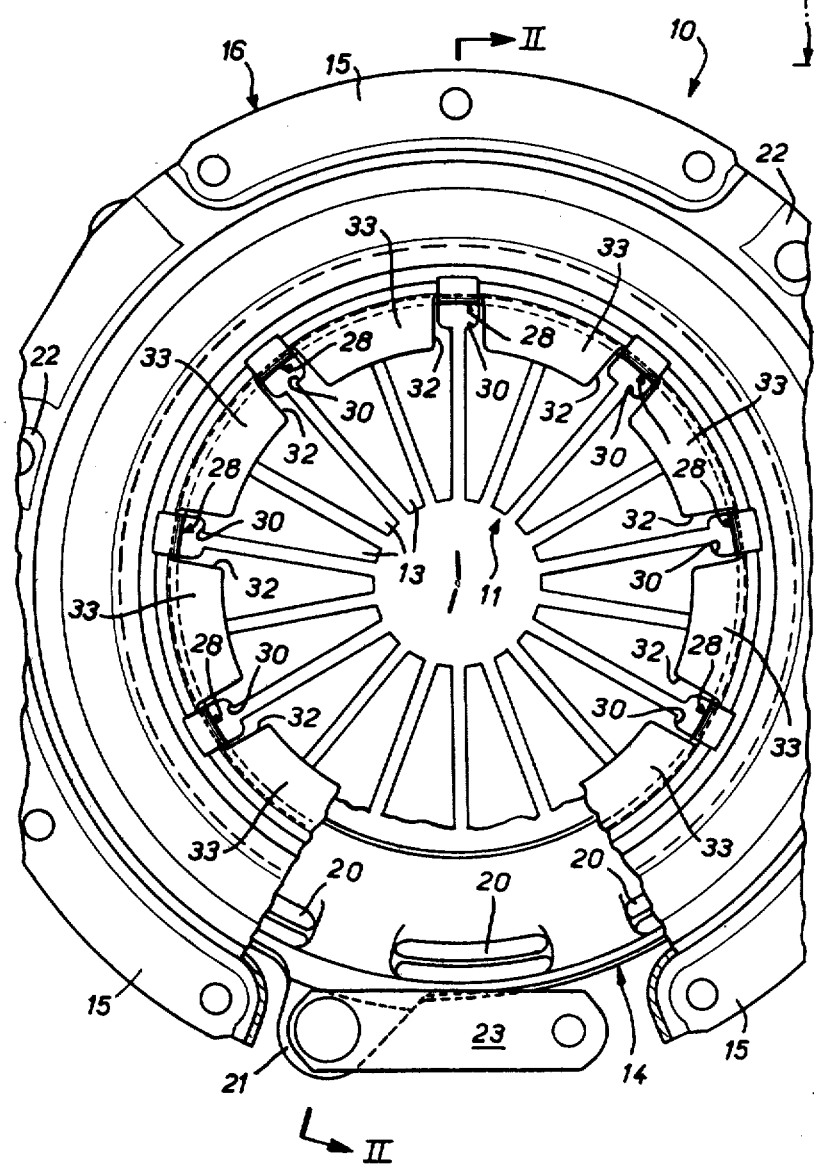
FIG. 1 is a partial elevation, along the arrow I of FIG. 2 and with a local cut-away section, of a diaphragm clutch mechanism according to the invention.
Figure 2:
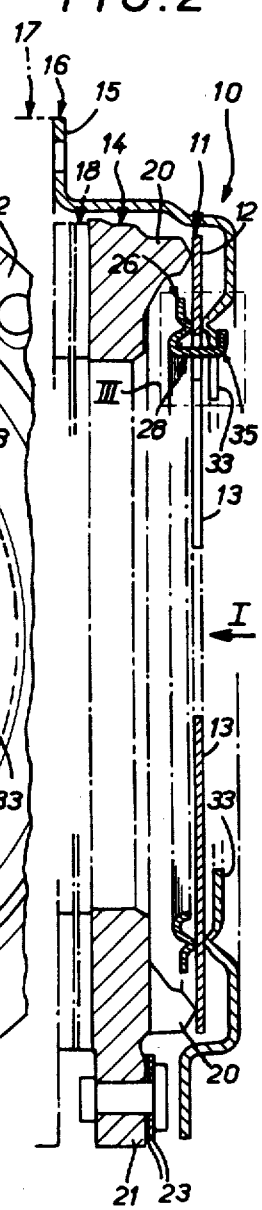
FIG. 2 is a view in axial section along the broken line II—II of FIG. 1.

FIG. 3 reproduces, on a larger scale, the detail of FIG. 2 marked by an inset III on this figure;

FIG. 4 is a partial view, in a circumferential section assumed to be unfolded flat, of the diaphragm clutch mechanism according to the invention, along the line IV—IV of FIG. 3;

FIGS. 5 and 6 are views analogous respectively to those of FIGS. 3 and 4 and relate to an alternative embodiment;

FIGS. 7 and 8 are, likewise, views analogous respectively to those of FIGS. 3 and 4 and relate to another alternative embodiment;

FIG. 9 is, on a different scale, a partial elevation only of the retaining ring employed in the alternative embodiment of FIGS. 7 and 8, before bending of the end of a retaining lug of this retaining ring;

FIGS. 10 and 11 are views analogous respectively to those of FIGS. 3 and 4 and relate to another alternative embodiment;

FIG. 12 is a view analogous to that of FIG. 10 and relates to another alternative embodiment;

FIG. 13 is a partial elevation analogous to that of FIG. 1 and relates to an alternative embodiment;

FIG. 14 is a partial view in axial section of this alternative embodiment along the line XIV—XIV of FIG. 13;

FIG. 15 is a partial view thereof, in a circumferential section assumed to be unfolded flat, along the line XV—XV of FIG. 14.

According to the embodiments illustrated in these figures, the diaphragm clutch mechanism according to the invention comprises a first substantially annular piece 10, called a cover, a second substantially annular piece 11, called a diaphragm, which has a peripheral part 12 constituting a cup spring and a central part which is divided into radial fingers 13, means of assembly securing the diaphragm 11 in a pivoting manner to the cover 10 and detailed below, and a third annular piece 14, called a pressure plate, which rotates integrally with the cover 10, while being movable axially in respect of said cover, as specified below, and on which the diaphragm 11 bears by its peripheral part constituting a cup spring.

By regions 15 of a radial peripheral rim 16, the cover 10 is adapted to be attached to a plate 17, called a reaction plate or flywheel, which is shown diagrammatically by dot-and-dash lines in FIG. 2 and which is integral with a first shaft, in practice a drive shaft, there being inserted between this reaction plate 17 and the pressure plate 14 a friction disc 18 which is, likewise, shown diagrammatically by dot-and-dash lines in FIG. 2 and which rotates integrally with a second shaft, in practice a driven shaft.

For the action of the diaphragm 11, the pressure plate 14 has, from place to place, axial bosses 20 on which bears the peripheral part 12, constituting a cup spring, of this diaphragm 11.

Peripherally, said pressure plate has, from place to place, radially projecting lugs 21 between which and regions 22 of the peripheral rim 16 of the cover 10 extend, substantially tangentially to a circumference of the whole assembly, tongues 23 which ensure that it rotates integrally with this cover 10, while allowing it to move axially.

These arrangements are well known per se, and, since they are not part of the present invention, they will not be described in detail here.

The cover 10 offers circularly a first support, or primary support, to the diaphragm 11, more precisely to the peripheral part 12, constituting a cup spring, of said diaphragm, on the inner periphery of this peripheral part, and, in the embodiments illustrated, it has annularly, for this purpose, a deformation in the form of a half-wave which constitutes a first bearing ring 25, FIG. 3.

The means of assembly which secure the diaphragm 11 in a pivoting manner to the cover 10 comprise the fourth annular piece 26, called a retaining ring, which, on the one hand, offers circularly a second support, or secondary support, to the diaphragm 11, on the side of said diaphragm lying opposite to the cover 10, and has, for this purpose, in the embodiment illustrated, at right angles to the deformation in the form of a half-wave 25 of this cover 10, a comparable deformation in the form of a half-wave 27, and which, on the other hand, is provided, as a single unit, with flat, thin retaining lugs 28 by means of which it is linked to the cover 10 and which each pass through the diaphragm 11 via an axial part 29.

The retaining lugs 28 are therefore in one piece with the retaining ring 26, the whole assembly resulting, for example, from appropriately bending and cutting one and the same initial blank.

In the embodiment illustrated, in particular, in FIGS. 1-4, since the root bending line of a retaining lug 28 of the retaining ring 26 extends essentially tangentially relative to a circumference of the whole assembly, the axial part 29 of such a retaining lug 28 is relatively thin radially and relatively elongate circumferentially.

Moreover, in this embodiment, the retaining lugs 28 of the retaining ring 26 pass axially through the diaphragm by way of apertures 30 which are made in the latter in the vicinity of the root of its radial fingers, at the end of slits which separate these fingers in pairs.

According to the invention, each retaining lug 28 of the retaining ring 26 bears on the cover 10 both axially in a first direction and axially in the opposite direction, so that it is fixed on said cover 10.

In the embodiment illustrated by FIGS. 1-4, each retaining lug 28 of the retaining ring 26 passes, by its axial part 29, through the cover 10 by way of a notch 32 provided in said cover between two radial tongues 33, and, on the far side of this cover 10 relative to the diaphragm 11, said retaining lug has a part 34 folded back radially in the opposite direction to the axis of the whole assembly, thus defining a wedging elbow 35 which enables it to bear axially on the cover 10, in a first direction, in the direction of the diaphragm 11.

For its fixing, according to the invention on the cover 10, each retaining lug 28 of the retaining ring 26 also has, in the embodiment illustrated in FIGS. 1-4, on the near side of the cover 10 relative to the diaphragm, a transverse shoulder 36 which enables it to bear axially on the cover 10 in the direction opposite to the preceding direction, hence in a direction opposite to the diaphragm 11.

Such a transverse shoulder 36 is formed on at least one of the axial edges of the axial part 29 of each retaining lug 28.

In the embodiment illustrated in FIGS. 3 and 4, a transverse shoulder 36 is provided on each of these axial edges.

Each retaining lug 28 thus clamps the cover 10 between its transverse shoulders 36, on the one hand, and its folded-back part 34, on the other hand, and is thus fixed on said cover 10.

In practice, the folded-back part 34 of a retaining lug 28 constitutes, on the far side of the transverse shoulders 36 of the latter, a prolongation of a smaller cross-section of such a retaining lug, which makes it easier to form the wedging elbow by bending.

In the foregoing, the retaining ring 26 extends, as a whole, on the outside of the cylindrical volume defined by the axial part 29 of its retaining lugs 28, these resulting from a bending which is effected in the direction opposite to the axis of the whole assembly.

Alternatively, according to FIGS. 5 and 6, the retaining ring 26 extends in part, in a circularly continuous manner, on the inside of the cylindrical volume defined by the axial part 29 of its retaining lugs 28 and, in part, in a circularly discontinuous manner, on the outside of this volume where it has, alternating with these retaining lugs 28, bearing lugs 38 which provide the diaphragm 11 with its secondary support.

According to the alternative embodiment illustrated in FIGS. 7-9 and according to the arrangements described in the French patent filed on Nov. 6th, 1979 under No. 79/27,276, which relates to a clutch mechanism in which the retaining lugs linking the retaining ring to the cover have come, as a single unit, not from this retaining ring, but from this cover, the transverse shoulder 36 which each retaining lug 28 of the retaining ring 26 possesses according to the invention involves only one of the axial edges of the axial part 29 of such a retaining lug 28, so that the other 39 of the axial edges of the latter is substantially rectilinear.

In practice and as illustrated in FIG. 9, for at least two retaining lugs 28 of the retaining ring 26, the axial edges 39 of these which are rectilinear are alternated circularly from one of these retaining lugs 28 to the other.

As explained in French Pat. No. 79/27,276 mentioned above, this arrangement is favourable to an easy fitting of the retaining ring 26 on the cover 10 when the whole assembly is stacked together.

As will be noted, in this embodiment illustrated in FIGS. 8 and 9, the retaining lugs 28 of the retaining ring 26 pass through the cover 10 not by way of simple notches in the latter, as above, but by way of apertures 42 which are made for this purpose in the cover 10.

According to the embodiments illustrated in FIGS. 11 to 14, the retaining lugs 28 of the retaining ring 26 have their root bending lines each extending substantially in a radial direction, so that the axial part 29 of these retaining lugs 28 is relatively thin circumferentially and relatively elongate radially.

The embodiments illustrated in FIGS. 10-12 are, however, of the type described above: each retaining lug 28 of the retaining ring 26 bears on the cover 10, on the one hand, on the far side of said cover relative to the diaphragm 11, and in a first direction, by a part 34 which is folded-back tangentially and thus constitutes a wedging elbow 35 with the axial part 29 which it adjoins, and, on the other hand, on the near side of the cover 10 relative to the diaphragm 11 and in a direction opposite to the preceding direction, by two transverse shoulders 36, FIGS. 10 and 11, or by a single transverse shoulder 36, FIG. 12.

In contrast thereto, in the embodiment illustrated in FIGS. 13 and 14, for its fixing on the cover 10, each retaining lug 28 of the retaining ring 26 has, on the one hand, on the near side of the cover 10 relative to the diaphragm 11, and as above, one or two transverse shoulders 36, to enable it to bear axially, in one direction, on said cover 10, and, on the other hand, on the far side of said transverse shoulder or shoulders, a prolongation of a smaller cross-section 43 which passes through the cover 10 by way of an aperture 42 in the latter and which, on the far side of this cover 10 relative to the diaphragm 11, is flattened at least locally to enable it to bear axially on the cover 10 in the direction opposite to the preceding direction.

For example, and as illustrated, the prolongation of smaller cross-section 43 of each retaining lug 28 is caulked over the whole of its periphery in the manner of a rivet, and thus overlaps the whole of the periphery of the corresponding aperture 42 of the cover 10.

However, this is not necessarily the case.

Moreover, and as will be noted, in this embodiment illustrated in FIGS. 13-15, the axial part 29 of the retaining lugs 28 of the retaining ring 26 passes axially through the diaphragm 11 by way of slits which separate the radial fingers 13 of said diaphragm in pairs.

Of course, the present invention is not limited to the embodiments described and illustrated, but embraces any practical alternative and/or alternative combination of their various elements.

In particular, the transverse shoulder or shoulders 36 which each retaining lug 28 of the retaining ring 26 possesses to enable it to bear axially on the cover 10, on the side of said cover facing the diaphragm 11, can be replaced by any equivalent means of support, such as projection, split flanging, inclined plane, rabbet or the like, of the type described, for example, in the French Patent filed on June 25th, 1979 under No. 79/16,226 which, like French Pat. No. 79/27,276 mentioned above, relates to a diaphragm clutch mechanism in which these retaining lugs originate not from the retaining ring, but from the cover.

Furthermore, the retaining lugs of the retaining ring can be fixed on the cover in other ways than by employing a wedging elbow for these retaining lugs; this fixing can result, for example, from tongues which define an axial stop and which are capable of withdrawing elastically upon assembly, as described in French Pat. No. 2,376,969.

Moreover, the retaining ring can offer a support to the diaphragm indirectly by way of a ring; likewise, the cover itself can offer a support to the diaphragm indirectly by way of a ring.

In addition, the scope of application of the invention is not limited to the case where, as described, the diaphragm clutch mechanism in question constitutes, in itself, a separate entity to be mounted as a whole on a reaction plate 17, but, on the contrary, also extends to the case where this clutch mechanism is considered to be already mounted on such a reaction plate, the whole constituting a diaphragm clutch, whatever the method of assembly then adopted for the various elements constituting this diaphragm clutch.

Finally, the scope of application of the invention is not limited to the case where, as described in French Pat. No. 79/16,226 mentioned above, a slight play is left to the diaphragm between its primary and secondary supports for the disengaged position of the whole assembly (not shown), although the invention is particularly suitable for such a case.

On the contrary, the scope of application of the invention also extends to the case where, since the retaining ring applies the diaphragm 11 elastically against the cover 10 under all circumstances, no play ever arises for the diaphragm between its primary and secondary support.

We claim:

1. A diaphragm clutch cover assembly for a motor vehicle, said cover assembly comprising an annular cover, a diaphragm spring having a peripheral portion defining a cup spring and a central part divided into radial fingers, a first annular fulcrum for said diaphragm spring defined on said cover, a retaining ring for pivotally mounting said diaphragm spring on said cover, a pressure plate mounted for rotation with said cover and axially displaceable relative to the cover, said peripheral portion of said diaphragm spring bearing against said pressure plate, said retaining ring comprising a second annular fulcrum for said diaphragm spring on the side of said diaphragm spring axially remote from said cover, said retaining ring having retaining lugs formed in one-piece thereof, said retaining lugs extending axially through said diaphragm spring and fixed to said cover, each of said retaining lugs bearing in a first axial direction and in an opposite axial direction against said cover thereby tightly clamping said retaining lugs axially on said cover.

2. The cover assembly of claim 1, wherein each of said retaining lugs comprises a locating bend between an axial portion and a bent-over end portion bearing against said cover in said opposite axial direction and each of said retaining lugs has a transverse shoulder on the side of said cover adjacent to said diaphragm spring for bearing axially against said cover in said first axial direction.

3. The cover assembly of claim 2, wherein the parts of axial portions extending through said cover have a smaller cross section than the rest of said axial portions said retaining lug end portions being at least locally flattened against said cover on the side thereof remote from said diaphragm spring.

4. The cover assembly of claim 2, wherein said transverse shoulder on each of said retaining lugs is provided along one axial edge thereof.

5. The cover assembly of claim 4, wherein the other axial edge of each of said retaining lugs is straight.

6. The cover assembly of claim 5, wherein said shoulders on circumferentially adjacent retaining lugs are provided along alternate axial edges thereof.

7. Diaphragm clutch mechanism according to claim 1, characterised in that, for their fixing on the cover, the retaining lugs of the retaining ring each have, on the one hand, on the near side of the cover relative to the diaphragm, a transverse shoulder to enable it to bear axially, in one direction, on said cover, and, on the other hand, on the far side of said transverse shoulder, a prolongation of smaller cross-section which passes through the cover and which, on the far side of said cover relative to the diaphragm, is flattened at least locally to enable it to bear axially on the cover in the direction opposite to the preceding direction.

8. Diaphragm clutch mechanism according to claim 7, characterised in that the transverse shoulder which each retaining lug of the retaining ring possesses is formed on at least one of the axial edges of an axial part of such a retaining lug.

* * * * *